(12) United States Patent
Theis et al.

(10) Patent No.: US 10,909,743 B2
(45) Date of Patent: Feb. 2, 2021

(54) MULTISCALE 3D TEXTURE SYNTHESIS

(71) Applicant: Magic Pony Technology Limited, London (GB)

(72) Inventors: Lucas Theis, London (GB); Zehan Wang, London (GB); Robert David Bishop, London (GB)

(73) Assignee: Magic Pony Technology Limited, London (GB)

( * ) Notice: Subject to any disclaimer, the term of this patent is extended or adjusted under 35 U.S.C. 154(b) by 6 days.

(21) Appl. No.: 15/856,759

(22) Filed: Dec. 28, 2017

(65) Prior Publication Data

US 2018/0122127 A1    May 3, 2018

Related U.S. Application Data

(63) Continuation of application No. PCT/GB2017/051277, filed on May 9, 2017.

(30) Foreign Application Priority Data

May 9, 2016    (GB) ..................... 1608101

(51) Int. Cl.
*G06T 15/04* (2011.01)
*G06K 9/62* (2006.01)
*G06N 3/08* (2006.01)

(52) U.S. Cl.
CPC ............ *G06T 15/04* (2013.01); *G06K 9/6219* (2013.01); *G06N 3/08* (2013.01)

(58) Field of Classification Search
CPC ......... G06T 7/40; G06T 11/00; G06T 11/001; G06T 11/40; G06T 15/00; G06T 15/04;
(Continued)

(56) References Cited

U.S. PATENT DOCUMENTS 5,680,475 A * 10/1997 Zwierski ............... G06T 11/001
                                                                382/156
5,889,526 A *  3/1999 Hashimoto ........... G06T 3/4007
                                                                345/582
(Continued)

FOREIGN PATENT DOCUMENTS

JP    2005275797 A    10/2005
WO   2017/194921 A1    11/2017

OTHER PUBLICATIONS

Search Report for Application No. GB1608101.0, dated Oct. 27, 2016, 4 pages.

(Continued)

*Primary Examiner* — Sae Won Yoon

(74) *Attorney, Agent, or Firm* — Brake Hughes Bellermann LLP

(57) ABSTRACT

Generating texture maps for use in rendering visual output. According to a first aspect, there is provided a method for generating textures for use in rendering visual output, the method comprising the steps of: generating, using a first hierarchical algorithm, a first texture from one or more sets of initialisation data; and selectively refining the first texture, using one or more further hierarchical algorithms, to generate one or more further textures from at least a section of the first texture and one or more sets of further initialisation data; wherein at least a section of each of the one or more further textures differs from the first texture.

20 Claims, 5 Drawing Sheets

(58) Field of Classification Search
CPC .... G06T 2210/36; G06N 99/005; G06N 3/08; G06N 3/0454; G06N 20/00; G05B 13/00; G06K 9/6219
USPC ............................................... 345/582
See application file for complete search history.

(56) References Cited

U.S. PATENT DOCUMENTS

| | | | |
|---|---|---|---|
| 6,292,191 B1 | 9/2001 | Vaswani et al. | |
| 6,304,268 B1* | 10/2001 | Iourcha | G06T 3/4007 345/428 |
| 6,853,373 B2* | 2/2005 | Williams | G06T 17/20 345/419 |
| 7,710,424 B1* | 5/2010 | Hutchins | G09G 5/363 345/537 |
| 9,679,362 B2* | 6/2017 | Chmielewski | G06T 5/002 |
| 10,726,356 B1* | 7/2020 | Zarandioon | G06N 7/005 |
| 2003/0193496 A1* | 10/2003 | Wada | G06T 15/10 345/419 |
| 2004/0257364 A1* | 12/2004 | Basler | G06T 17/05 345/426 |
| 2006/0038823 A1* | 2/2006 | Arcas | G06T 3/4007 345/587 |
| 2007/0002067 A1* | 1/2007 | Lefebvre | G06T 3/40 345/582 |
| 2007/0002071 A1* | 1/2007 | Hoppe | G06T 11/001 345/582 |
| 2007/0165035 A1* | 7/2007 | Duluk, Jr. | G06T 1/60 345/506 |
| 2007/0223887 A1* | 9/2007 | Kanamori | G06T 3/4053 386/232 |
| 2008/0273042 A1* | 11/2008 | Cai | G06T 15/04 345/582 |
| 2011/0065506 A1 | 3/2011 | Sugden | |
| 2011/0115806 A1* | 5/2011 | Rogers | G06T 9/00 345/582 |
| 2013/0342553 A1* | 12/2013 | Subag | G06T 11/40 345/552 |
| 2014/0071124 A1* | 3/2014 | Kawahara | G06T 15/503 345/419 |
| 2016/0358099 A1* | 12/2016 | Sturlaugson | G06N 5/043 |

OTHER PUBLICATIONS

International Search Report and Written Opinion for PCT Application No. PCT/GB2017/051277, dated Aug. 8, 2017, 13 pages.
Englert, et al, "A Model for Description and Synthesis of Heterogeneous Textures", Proceedings of the European Computer Graphics Conference, Sep. 4, 1989, 13 pages.
Gatys, et al., "Texture Synthesis and the Controlled Generation of Natural Stimuli Using Convolutional Neural Networks", retrieved on Aug. 29, 2016 from https://pdfs.semanticscholar.org/ecef/28ddfcacf4f2ba9c22a3c8296d4e19322d3d.pdf, May 27, 2015, 9 pages.
Gelenbe, et al., "Learning in the Multiple Class Random Neural Network", IEEE Transactions on Neural Networks, vol. 13, No. 6, Nov. 1, 2002, 23 pages.
Yoo, et al., "Texture Enhancement for Improving Single-Image Super-Resolution Performance", Signal Processing: Image Communication, vol. 46, May 3, 2016, pp. 29-39.
Office Action for European Application No. 17723497.8, dated Jun. 10, 2020, 6 pages.
Slot, et al., "Fast Generation of Natural Textures With Cellular Neural Networks-based Stitching", 2010 12th International Workshop on Cellular Nanoscale Networks and their Applications (CNNA), IEEE, Feb. 3, 2010, 4 pages.

\* cited by examiner

MULTISCALE 3D TEXTURE SYNTHESIS

CROSS-REFERENCE TO RELATED APPLICATIONS

This application is a continuation of, and claims priority to, International Patent Application No. PCT/GB2017/051277, filed on May 9, 2017, entitled "MULTISCALE 3D TEXTURE SYNTHESIS," which in turn claims priority to United Kingdom Patent Application No. GB 1608101.0, filed on May 9, 2016, the contents of both of which are incorporated herein by reference.

FIELD

This disclosure relates to generating texture maps for use in rendering visual output. More particularly, the present disclosure relates generating texture maps at multiple resolution scales using hierarchical algorithms.

BACKGROUND

Texture Maps

In the fields of computer graphics and 3D modelling, surface details are added to objects using texture maps. Texture maps add colouring and other properties to 3D models, turning them from flat un-textured surfaces into more detailed representations of the object being modelled. The texture is mapped onto the 3D model.

Texture maps can comprise colour maps, such as RGB maps, that apply colouring the 3D models. These define the surface colours for a particular texture, and are perhaps the most common form of texture map. Colour maps are also referred to as diffuse maps. Generally, they contain no lighting or shading information relating to the surface texture.

Further texture maps on top of the colour maps can be used to add additional texture features to the 3D model. Normal maps are a map of the surface normal vectors of the texture, which can be used to enhance lighting effects on the model. Specular maps contain information relating to the shininess of areas on the surface. Displacement maps, bump maps, depth maps and height maps all add the effect of raised and lowered details on the surface. These additional texture maps are often referred to as additional channels of the texture map.

When used to render objects, especially in gaming environments, the textures applied to an object need to have different visual qualities at different scales. For example, an object close by is required to have a more detailed texture, but on a smaller scale, than objects at a distance, which can appear less detailed but need to be rendered on a larger scale. In order to avoid tiling a small texture repeatedly, which generates periodicities in the displayed texture, a large texture at a high resolution needs to be stored. This consumes a large amount of memory and can also be computationally expensive, especially when a large number of different textures are required for rendering objects.

Furthermore, the creation of textures and environments for use in games, special effects and/or artistic works is often performed by artists or designers. In order to prevent the same textures appearing repeatedly on rendered objects, which can reduce the viewing experience, studios often have to hire more artists or designers to create variation in the textures. This can be costly and inefficient, especially if additional map types other than colour maps are required, as these often prove challenging for artists to create and costly for studios.

Machine Learning Techniques

Machine learning is the field of study where a computer or computers learn to perform classes of tasks using the feedback generated from the experience or data gathered that the machine learning process acquires during computer performance of those tasks.

Typically, machine learning can be broadly classed as supervised and unsupervised approaches, although there are particular approaches such as reinforcement learning and semi-supervised learning which have special rules, techniques and/or approaches.

Supervised machine learning is concerned with a computer learning one or more rules or functions to map between example inputs and desired outputs as predetermined by an operator or programmer, usually where a data set containing the inputs is labelled.

Unsupervised learning is concerned with determining a structure for input data, for example when performing pattern recognition, and typically uses unlabelled data sets.

Reinforcement learning is concerned with enabling a computer or computers to interact with a dynamic environment, for example when playing a game or driving a vehicle.

Various hybrids of these categories are possible, such as "semi-supervised" machine learning where a training data set has only been partially labelled.

For unsupervised machine learning, there is a range of possible applications such as, for example, the application of computer vision techniques to image processing or video enhancement. Unsupervised machine learning is typically applied to solve problems where an unknown data structure might be present in the data. As the data is unlabelled, the machine learning process is required to operate to identify implicit relationships between the data for example by deriving a clustering metric based on internally derived information. For example, an unsupervised learning technique can be used to reduce the dimensionality of a data set and attempt to identify and model relationships between clusters in the data set, and can for example generate measures of cluster membership or identify hubs or nodes in or between clusters (for example using a technique referred to as weighted correlation network analysis, which can be applied to high-dimensional data sets, or using k-means clustering to cluster data by a measure of the Euclidean distance between each datum).

Semi-supervised learning is typically applied to solve problems where there is a partially labelled data set, for example where only a subset of the data is labelled. Semi-supervised machine learning makes use of externally provided labels and objective functions as well as any implicit data relationships.

When initially configuring a machine learning system, particularly when using a supervised machine learning approach, the machine learning algorithm can be provided with some training data or a set of training examples, in which each example is typically a pair of an input signal/vector and a desired output value, label (or classification) or signal. The machine learning algorithm analyses the training data and produces a generalised function that can be used with unseen data sets to produce desired output values or signals for the unseen input vectors/signals. The user needs to decide what type of data is to be used as the training data, and to prepare a representative real-world set of data. The user must however take care to ensure that the training data contains enough information to accurately predict desired output values without providing too many features (which can result in too many dimensions being considered by the machine learning process during training, and could also mean that the machine learning process does not converge to good solutions for all or specific examples). The user must also determine the desired structure of the learned or generalised function, for example whether to use support vector machines or decision trees.

The use of unsupervised or semi-supervised machine learning approaches are sometimes used when labelled data is not readily available, or where the system generates new labelled data from unknown data given some initial seed labels.

SUMMARY

Aspects and/or embodiments seek to provide an improved method of texture generation for use in visual rendering.

According to a first aspect, there is provided a method for generating textures for use in rendering visual output, the method comprising the steps of: generating, using a first hierarchical algorithm, a first texture from one or more sets of initialisation data; and selectively refining the first texture, using one or more further hierarchical algorithms, to generate one or more further textures from at least a section of the first texture and one or more sets of further initialisation data; wherein at least a section of each of the one or more further textures differs from the first texture. This can enable more detailed and/or more varied textures to be created based on the input textures.

Optionally, one or more of the one or more further textures may differ from the first texture in being at a higher resolution and/or in being different class of texture map and/or in comprising a region of texture not present in first texture. This can enable a more varied set of textures to be generated from the first texture, which can provide a more aesthetically pleasing rendering of one or more 3D objects.

Optionally, the one or more sets of initialisation data may comprise one or more initial sets of random noise, which may comprising the step of generating the one or more initial sets of random noise. The one or more sets of random noise may be generated from one or more sets of noise parameters, wherein the one or more sets of noise parameters may comprise at least one of: a random noise generator type; a random noise generator distribution; a seed or initialisation parameter; and/or one or more directional components and/or one or more noise generation procedures. Optionally, the method may further comprise the step of storing the one or more sets of noise parameters. This can enable the one or more further textures to be randomly modified which may result in a greater level of variation.

Optionally, the one or more sets of further initialisation data may comprise one or more sets of further random noise which may comprise the step of generating the one or more sets of further random noise. Optionally, the one or more sets of further random noise may be generated from one or more sets of further noise parameters, wherein the one or more sets of further noise parameters may comprise at least one of: a random noise generator type; a random noise generator distribution; a seed; and/or a directional component or procedure. Optionally, the method may further comprise the step of storing the one or more sets of further noise parameters. The generation of one or more sets of further random noise can enable different sets of noise to be generated based upon different parameters and/or based upon different hardware characteristics of a system or apparatus designed to execute the method.

Optionally, the one or more sets of initialisation data may comprise a known texture and/or wherein the one or more sets of further initialisation data may comprise a known texture. Optionally, the known texture comprises at least a part of a previously generated first texture and/or previously generated one or more further textures. This can enable the one or more generated textures to be visually similar to the one or more known textures provided as initialisation data.

Optionally, the method may further comprise the step of storing the first texture and/or one or more further textures in a texture library after they have been generated. This can enable generated textures to be reused without the need for regenerating them.

Optionally, the first texture and/or one or more of the one or more further textures may comprise a colour map. Optionally, the first texture and/or one or more of the one or more textures may further comprise one or more additional maps comprising at least one of: a normal map; a height map; a bump map; a displacement map; a specular map; or a depth map, and/or wherein the one or more additional maps may be jointly optimised with the colour map and any of the other one or more additional maps. This can enable a more varied texture to be generated based upon a number of factors including the object upon with the texture may be applied.

Optionally, the method may further comprise the step of generating one or more additional maps from the first texture using a separate hierarchical algorithm. Optionally, the method may further comprise the step of generating one or more further additional maps from the second texture using an additional separate hierarchical algorithm, wherein the additional separate hierarchical algorithm may additionally take the one or more additional maps as an input. Optionally, the one or more additional maps and/or one or more further additional maps may comprise at least one of: a normal map; a height map; a bump map; a displacement map; a specular map; or a depth map. This can enable one or more different hierarchical algorithms which may have a different set of parameters to generate one or more textures different from the one or more other hierarchical algorithms. The separate hierarchical algorithm used to generate the one or more additional maps from the first texture can be different to the first hierarchical algorithm, or identical to it.

Optionally, the first and one or more of the one or more further hierarchical algorithms share one or more layers. Having a number of layers in some embodiments, which may or may not be sequential, recurrent, recursive, branching or merging allows different levels of processing to occur at different times and the layers can work in parallel, ensuring optimal efficiency when enhancing the resolution of the visual data.

Optionally, the first texture and/or one or more further textures may be output in real time. The one or more further textures may comprise a plurality of further textures, and the hierarchical algorithms may be texture specific, wherein the hierarchical algorithms may be selected from a library of hierarchical algorithms based on properties of a texture required to be generated. This enables any generated textures to be displayed and applied to an object quickly, and also enables more accurate generation of the textures based upon the parameters of the hierarchical algorithms and other system/texture requirements.

Optionally, the hierarchical algorithms were developed using a learned approach, and/or the hierarchical algorithms may comprise a feed forward process, and/or the hierarchical algorithms may form a part of an iterative optimisation process. In some embodiments, hierarchical or non-hierarchical algorithms can be substantially accurate and therefore enable a more accurate reconstruction, for example produce higher quality visual data from the low-quality visual data that is transmitted, for example where quality can be measured by resolution, a perceptual measure or metric determining that the quality is sufficiently aesthetically pleasing or by a low reproduction error rate in comparison to the original high-quality visual data. In another example, the hierarchical or non-hierarchical algorithms can produce higher quality versions of visual data using the fidelity data. In some optional embodiments, a down-sampled version of the resulting visual data comes out to be the same or similar as a down-sampled version of the original visual data. In some embodiments, using a learned approach can substantially tailor the hierarchical model or models for each portion of visual data.

Optionally, each of the hierarchical algorithms may comprise at least one: a nonlinear hierarchical algorithm; a neural network; a convolutional neural network; a layered algorithm; a recurrent neural network; a long short-term memory network; a multi-dimensional convolutional network; a memory network; or a gated recurrent network.

According to a second aspect, there is provided a method of training hierarchical algorithms for use in texture generation, the method comprising the steps of: generating one or more textures at a first resolution from a known texture at a second resolution using a hierarchical algorithm; and optimising at least a subset of the hierarchical algorithm parameters based on results of comparing the statistics of the one or more textures to statistics of one or more further known textures at the first resolution; wherein the first resolution is higher than the second resolution. This can enable textures to be generated and refined by hierarchical algorithms, which are then optimised so as to generate more optimal textures based upon received inputs and the generated outputs.

Optionally, the statistics of the one or more textures may be calculated using a descriptor network. Optionally, the hierarchical algorithm may stored in a library of hierarchical algorithms after being optimised. This enables the trained hierarchical algorithm to be reused without the need for regenerating it.

Optionally, the hierarchical algorithm may be trained to be texture specific, this may enable the hierarchical algorithm to be optimised for generating a texture based upon a specific texture provided as an input.

As used herein, the term hierarchical algorithm is preferably used to connote an algorithm with a hierarchical a structure. Examples of such algorithms include, but are not limited to, a nonlinear hierarchical algorithm; a neural network; a convolutional neural network; a layered algorithm; a recurrent neural network; a long short-term memory network; a multi-dimensional convolutional network; a memory network; or a gated recurrent network.

BRIEF DESCRIPTION OF DRAWINGS

Embodiments will now be described, by way of example only and with reference to the accompanying drawings having like-reference numerals, in which.

DETAILED DESCRIPTION

Figure 1:
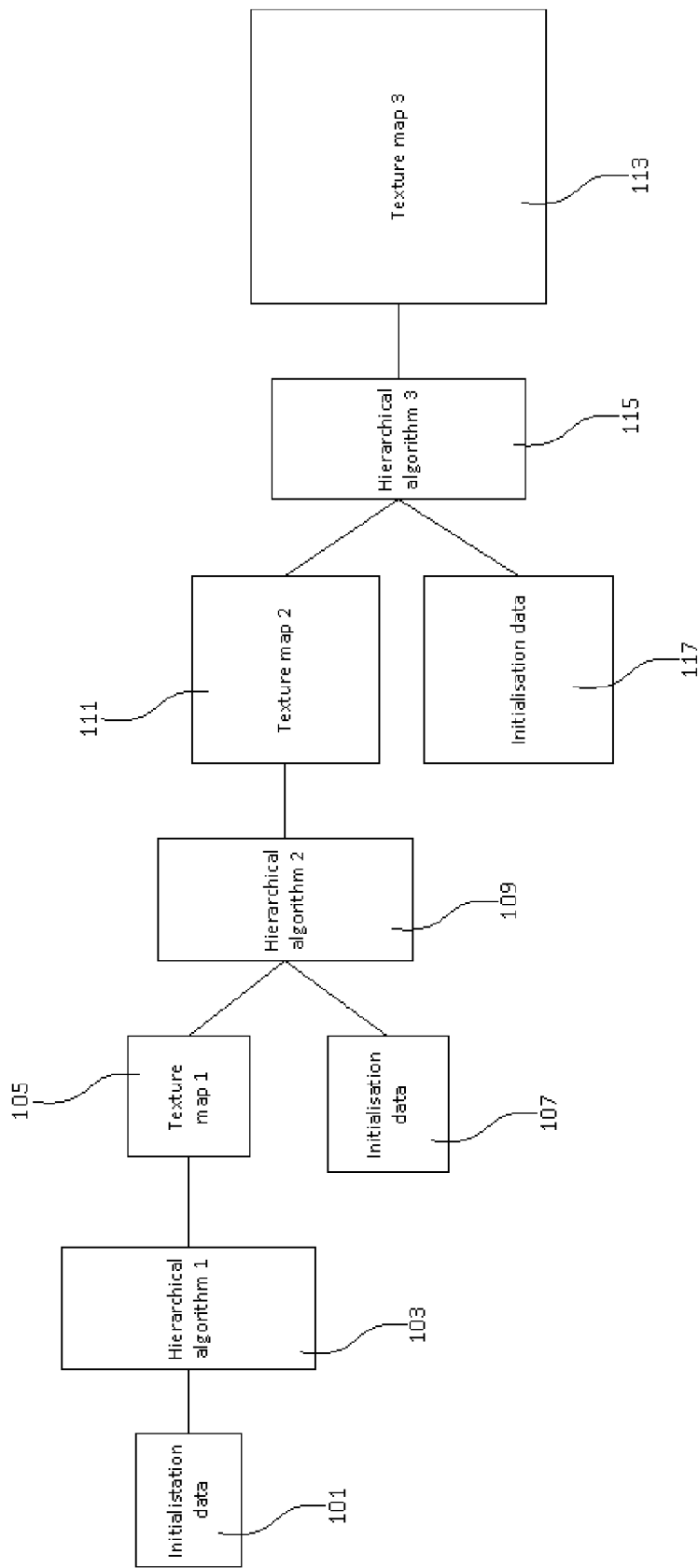
FIG. 1 illustrates an example of a multiscale texture generation network.

Referring to FIG. 1, an embodiment of a multiscale texture generation method will now be described.

FIG. 1 illustrates an example of a multiscale texture generation network. Initialisation data 101 is input into a first pretrained hierarchical algorithm 103. The first hierarchical algorithm 103 uses the initialisation data 101 to generate a first texture map 105 at a first resolution, which it then outputs. This first texture map 105 is then used as an input, along with a further set of initialisation data 107, for a second hierarchical algorithm 109. The second hierarchical algorithm 109 uses the first texture map 105 and the further initialisation data 107 to generate a second texture map 111, which is then output. The second texture map 11 is at a higher resolution to the first texture map 105. This process can then be repeated on the second texture map 111, to generate a third texture map 113 at a higher resolution than the second texture map 111 using a third hierarchical algorithm 115 and another set of initialisation data 117. In general, the process can be repeated N times to generate a series of texture maps at increasingly higher resolutions. The output texture map of the $m^{th}$ hierarchical algorithm is used along with a new set of initialisation data as the input for $(m+1)^{th}$ hierarchical algorithm until texture maps at all the required resolutions have been generated, or until the highest resolution that the hierarchical algorithms have been trained for is reached.

The initialisation data used at each step of the process comprises random noise, and/or a known texture sample. The initialisation data can be saved in order to generate identical textures in the future. This will be required when a user, for example a player in a game, views the same texture in the same context at a future point in order to provide temporally consistency to an object's texture. Properties of the initialisation data, such as the amount of noise present, can be altered to provide a degree of control over the generated textures. Alternatively, the initialisation data can be one or more sets of parameters for generating random noise, such as the random generator type and/or distribution, a seed to start the generation from, and/or a directional component or procedure for how to proceed with the noise generation. Using a known texture as initialisation data allows variations on an existing artwork created by an artist to be created.

In an embodiment, the output textures comprise colour maps, such as an RGB map. These output textures can be saved in a library for future use to avoid regenerating them every time they are required. In some embodiments, this library only stores the generated textures temporarily, for example only while a player of a computer game is in the vicinity of the area for which the textures were generated.

The generation of the textures at multiple resolution scales can be performed on an ad-hoc, on the fly basis to meet a requirement for a particular texture at a certain resolution scale. For example, during a computer game a player may approach a textured object within the game from a distance. At this distance, the texture map for the object may only be required at a low resolution, so only the first texture map is generated. As the player approaches the object, higher resolution texture maps will be required to maintain the visual quality of the textured object, and these texture maps are required to be consistent with the coarser previously generated coarser texture maps. These higher resolution texture maps will be generated from the coarser texture maps and initialisation data by the hierarchical algorithms as and when they are required for display to the player—in this example as the player approaches the texture object. In effect, the network of hierarchical algorithms generates a texture at a coarse scale, and then selectively refines the texture where needed.

The series of hierarchical algorithms are trained on known sets of texture maps of a particular texture at different resolutions. The set contains known texture maps at a variety of resolutions, each indexed by an integer, s, up to the total number of texture resolutions that will be output by the series of hierarchical algorithms, S.

For each hierarchical algorithm in the sequence of hierarchical algorithms, a known texture map and a set of random noise is input. The texture map output of the $s^{th}$ hierarchical algorithm in the series is denoted by $f_\theta^s(x^{s-1}, Z^{s-1})$, where $x^{s-1}$ is a known texture map at the resolution output by the $(s-1)^{th}$ hierarchical algorithm in the sequence and $Z^{s-1}$ is the set of random noise used as the input to the $s^{th}$ hierarchical algorithm. The parameters of each of the hierarchical algorithms, θ, are what is being varied in order to optimise the hierarchical algorithms.

At training time, the texture map output by each of the hierarchical algorithms in the sequence is input into a descriptor network, which calculates some statistical properties, $\Psi(f_\theta^s(x^{s-1}, Z^{s-1}))$, of the generated texture maps. These are compared with statistical properties of the known texture maps at the same resolution, $\Psi(x^s)$. The hierarchical algorithms are optimised by (approximately) minimising an expectation value, for example:

$$E = \mathbb{E}\left[\sum_{s=1}^{S} \|\Psi(f_\theta^s(x^{s-1}, Z^{s-1})) - \Psi(x^s)\|^2\right]$$

However, other objective functions can also be used. At the training time, it may be the case that only a subset of the hierarchical algorithms' parameters is optimised at any given time.

In effect, the training objective is to match image statistics at multiple scales. Once trained, the hierarchical algorithms can be stored in a library of hierarchical algorithms, along with metadata relating to the sets of texture on which they were trained. This metadata can include, for example, the texture that the hierarchical algorithm was trained on, the resolutions of the training textures, and/or the texture map types output by the hierarchical algorithm.

While the above embodiment has been described in relation to generating texture maps of different resolutions, the method can also be used to generate texture maps that differ from each other in other properties instead. For example, the second, and possibly subsequent, texture maps generated by this method may be at the same resolution as the first texture map, but contain additional visual content that is not present in the first texture map.

Figure 2:
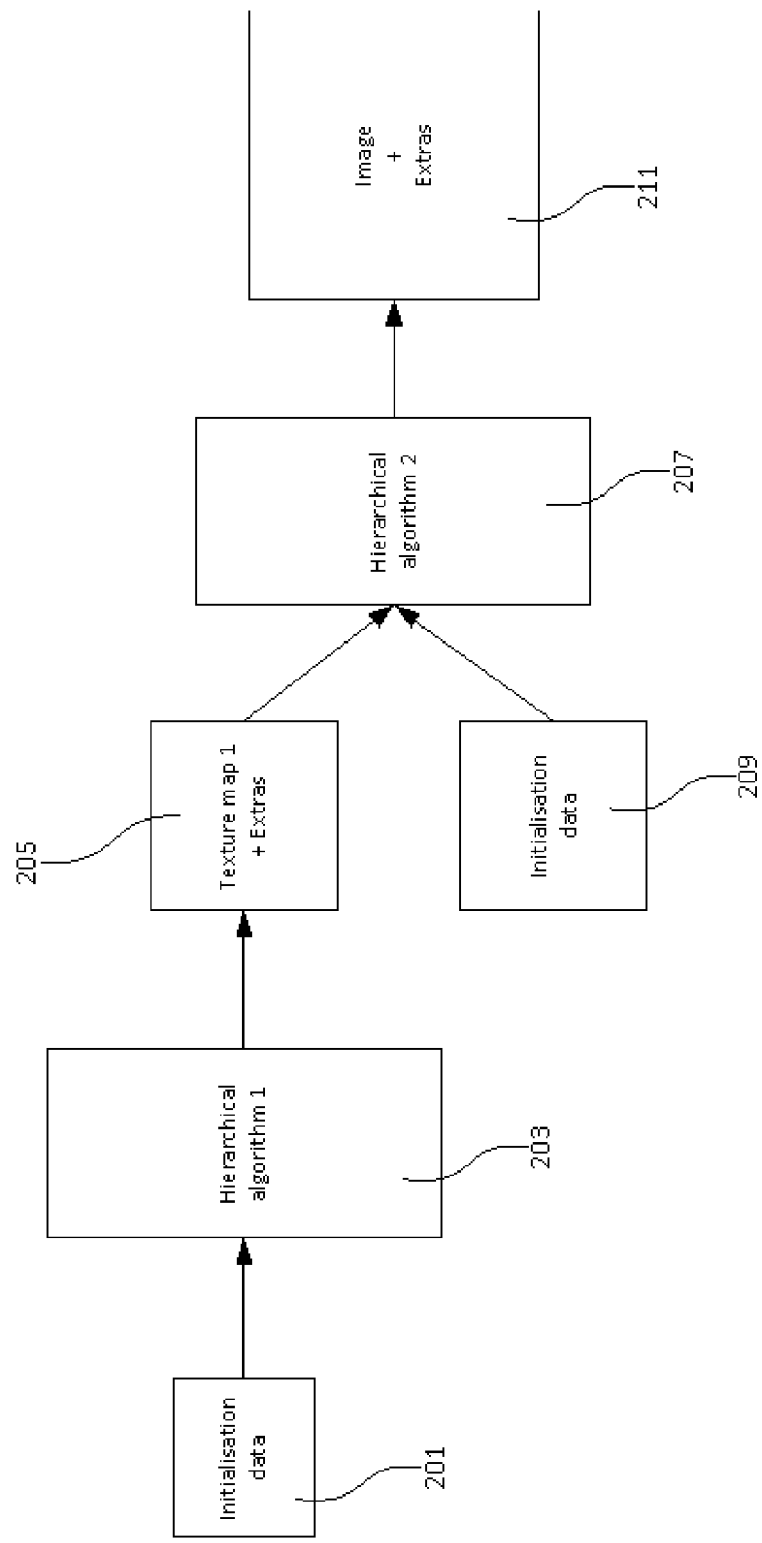
FIG. 2 illustrates an embodiment of a texture generation process for generating multiple texture map types.

FIG. 2 illustrates an embodiment of a texture generation process for generating multiple texture map types. In this embodiment, one or more sets of initialisation data 201, such as random noise, one or more sets of parameters that can be used to generate random noise, or a known texture, are used as an input into a first hierarchical algorithm 203. The first hierarchical algorithm 203 outputs a first set of texture maps 205, which includes a colour map, such as an RGB map, and one or more further additional maps, for example at least one of: a normal map; a height map; a bump map; a displacement map; a specular map; and/or a depth map. The first set of texture maps 205 can then be used as an input into a second hierarchical algorithm 207, along with a new set of initialisation data 209. The second hierarchical algorithm 207 will output a further set of textures 211. At least a section of the further set of textures 211 differs from the first set of textures 203. This difference can be, for example, that the further set of textures 211 is at a higher resolution to the first set of textures 203, that it contains texture content that is not present in the first set of textures 203, and/or that at least one of the additional texture maps is a different type to those in the first set of texture maps 203.

In some embodiments, the set of further textures 211 output of the further hierarchical algorithm can be used as input for another hierarchical algorithm to generate more sets of further texture maps. This can be repeated iteratively, using the set of textures output by the $(n-1)^{th}$ hierarchical algorithm in the sequence and a set of initialisation data as the input for the $n^{th}$ hierarchical algorithm in the sequence. The $n^{th}$ hierarchical algorithm will then output the next set of textures.

The hierarchical algorithms used in this model are trained on sets of known texture maps, y. The set contains known texture maps with a variety of properties, each indexed by an integer, s, up to the total number, S. The sets of known texture maps include both colour maps, such as RGB maps, and known additional maps, as described above. For the purposes of optimisation, each of the additional texture maps, also referred to as additional channels, is input into a descriptor network to calculate statistical properties of that texture map. The descriptor network treats each of these channels as RGB channels when generating the statistics.

For example, let y be an M×N image/set of texture maps with extra channels corresponding to additional texture map types—i.e. instead of having M×N×3 dimensions, as would be the case for just an RGB map, y will have M×N×D channels. Each of the types of texture map in y corresponds to three of D available channels. For example $y_{1:3}$ denotes the RGB channels and $y_{4:6}$ could denote the normal map channels.

For each hierarchical algorithm in the sequence of hierarchical algorithms being trained, the known set of texture maps and a set of random noise is input. The texture map output into a particular set of channels (d to d+2) of the $s^{th}$ hierarchical algorithm in the series is denoted by $f_\theta^s(y^{s-1}, Z^{s-1})_{d:d+2}$, where $y^{s-1}$ is a known texture map with the desired properties of the output of the $(s-1)^{th}$ hierarchical algorithm in the sequence and $Z^{s-1}$ is the set of random noise used as the input to the $s^{th}$ hierarchical algorithm. The parameters of each of the hierarchical algorithms, θ, are what is being varied in order to optimise the hierarchical algorithms.

The channels associated with each of the texture maps output by the hierarchical algorithms in the sequence being trained are input into a descriptor network, which calculates some statistical properties, $\Psi(f_\theta^s(y^{s-1}, Z^{s-1})_{d:d+2})$, of the generated texture maps. These are compared with statistical properties of the known texture maps with the desired properties in that channel, $\Psi(y_{d:d+2}^s)$. The hierarchical algorithms are optimised by minimising an expectation value, for example:

$$E = \mathbb{E}\left[\sum_{s=1}^{S} \sum_{d=1}^{D-3+1} \|\Psi(f_\theta^s(y^{s-1}, Z^{s-1})_{d:d+2}) - \Psi(y_{d:d+2}^s)\|^2\right]$$

At the training time, it may be the case that only a subset of the hierarchical algorithms' parameters is optimised at any given time.

In general, arbitrary subsets of channels can be selected to optimise the hierarchical algorithms; the channels used in the expectation value do not have to correspond with the types of texture maps being used.

Once trained, the hierarchical algorithms can be stored in a library of hierarchical algorithms, along with metadata relating to the sets of texture on which they were trained. This metadata can include, for example, the texture that the hierarchical algorithm was trained on, the resolutions of the training textures, and/or the texture map types output by the hierarchical algorithm.

Figure 3:
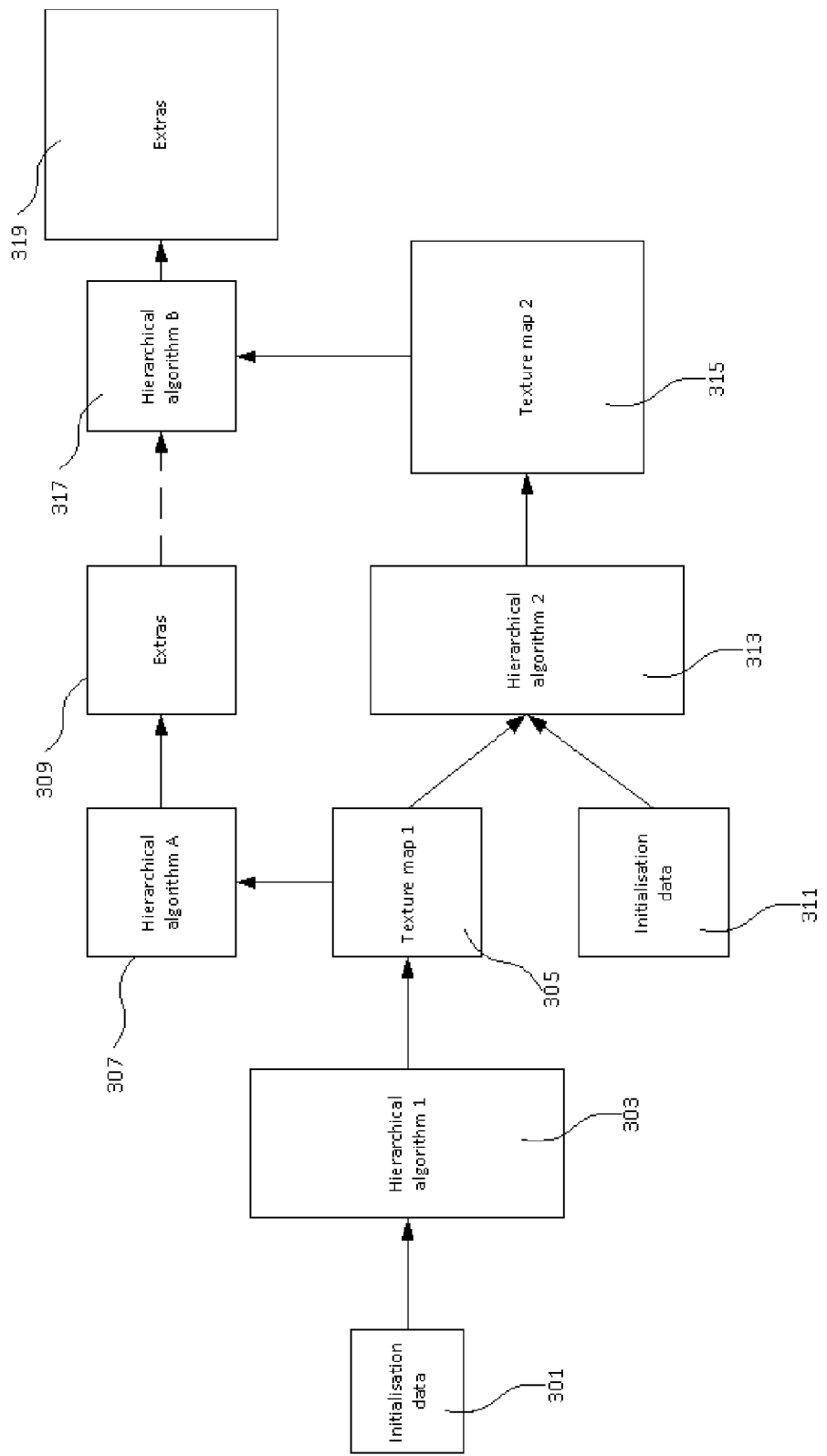
FIG. 3 illustrates an alternative embodiment of a texture generation process for generating multiple texture map types.

FIG. 3 illustrates an alternative an embodiment of a texture generation process for generating multiple texture map types. In this embodiment, one or more sets of initialisation data 301, such as random noise, one or more sets of parameters that can be used to generate random noise, or a known texture, are used as an input into a first hierarchical algorithm 303. The first hierarchical algorithm 303 outputs a first texture map 305, such as a colour map. This first texture map 305 is used as the input for hierarchical algorithm A 307, which generates one or more further texture maps 309 of a different type to the first texture map 303, but at the same resolution as the first texture map 303. For example, if the first texture map 303 is a colour map, hierarchical algorithm A 307 generates a normal map from the colour map.

In some embodiments, the first texture map 303, along with a new set of initialisation data 311, is used as an input of a second hierarchical 313 algorithm to generate a second texture map 315 that is of the same type as the first texture map 305, but at a higher resolution to the first texture map 305. This second texture map 315 is used as the input for hierarchical algorithm B 317, which generates one or more further texture maps 319 of a different type to the second texture map 315, but at the same resolution as the second texture map 315. Optionally, the further texture maps 309 output by hierarchical algorithm A 307 can also be used as an input to hierarchical algorithm B 317.

In some embodiments, the method can be repeated iteratively, using the texture map output by the $(n-1)^{th}$ hierarchical algorithm in the sequence and a set of initialisation data as the input for the $n^{th}$ hierarchical algorithm in the sequence. The $n^{th}$ hierarchical algorithm will them output the next set of textures at a higher resolution to the $(n-1)^{th}$ texture map. The $n^{th}$ texture map will then be used as an input to an additional hierarchical algorithm that generates one or more further texture maps of a different type to the $n^{th}$ texture map, but at the same resolution as the $n^{th}$ texture map. These additional hierarchical algorithms can optionally take the one or more further texture maps generated from the $(n-1)^{th}$ texture map as input as well.

Essentially, there is a separate hierarchical algorithm which takes a texture map at a particular resolution as an input, and outputs a texture map at the same resolution, but of a different type to the input texture map.

Figure 4:
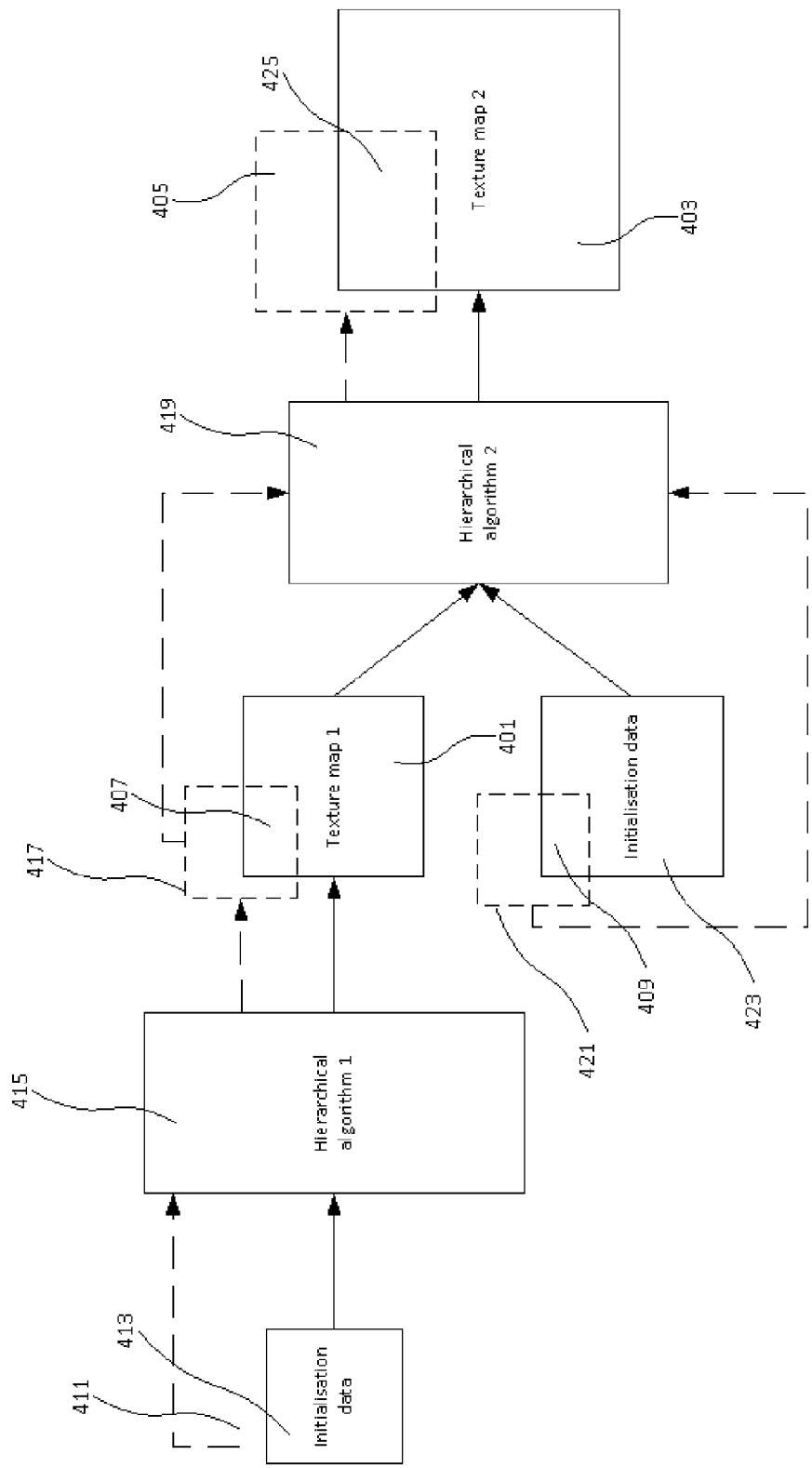
FIG. 4 illustrates an embodiment of a texture generation process for generating extensions of a known texture.

In this embodiment, the hierarchical algorithms used to generate the texture maps from random noise and previously generated texture maps, such as hierarchical algorithm 1 and hierarchical algorithm 2, are trained as described in relation to the embodiment in FIG. 4. The additional hierarchical algorithms, such as hierarchical algorithm A and hierarchical algorithm B, are trained separately.

The further texture map output of the $s^{th}$ additional hierarchical algorithm in the series is denoted by $g_\phi^s(x^s, y^{s-1})$, $x^s$ is a known texture map of the same type as the first texture map and at the resolution of the further texture map being output by the additional hierarchical algorithm being trained. $y^{s-1}$ denotes one or more known further texture map at a resolution lower than the further texture map being output by the additional hierarchical algorithm being trained. $\phi$ denotes a set of parameters of the additional hierarchical algorithm that are optimised, or have been optimised, during the training process.

A descriptor network is applied to the further texture map output by the hierarchical algorithm being trained in order to calculate a set of statistical properties of the output further texture map, $\Psi(g_\phi^s(x^s, y^{s-1}))$. This is compared with statistical properties of known further texture maps at the same resolution as the output further texture map, $\Psi(y^s)$, in order to optimise the set of parameters of the additional hierarchical algorithm, $\phi$. The hierarchical algorithms are optimised by minimising an expectation value, for example:

$$E = \mathbb{E}\left[\sum_{s=1}^{S} \|\Psi(g_\phi^s(x^s, y^{s-1})) - \Psi(y^s)\|^2\right]$$

At the training time, it may be the case that only a subset of the hierarchical algorithms' parameters is optimised at any given time.

Once trained, the additional hierarchical algorithms can be stored in a library of hierarchical algorithms, along with metadata relating to the sets of texture on which they were trained. This metadata can include, for example, the texture that the additional hierarchical algorithm was trained on, the resolutions of the training textures, and/or the texture map types output by the additional hierarchical algorithm.

The generation of the texture maps can be performed in real time in an ad-hoc basis as the requirement to display new textures becomes apparent. The textures are then generated when, for example, a player or viewer first sees them, rather than having exact textures pre-determined. As a result, a completely new look can be created each time the texture is generated, which can result, for example, in an different game world every time a player starts a new game.

FIG. 4 illustrates an embodiment of a texture generation process for generating extensions of a known texture. In this embodiment, texture maps at different resolutions (401 and 403) have previously been generated using any of the embodiments described in FIGS. 1 to 3. A new texture map region 405 is requested for generation that partially overlaps with a previously generated texture map 403 at a particular resolution. The corresponding overlapping sections of the texture map at coarser resolutions 407 are determined, along with the corresponding sections of initialisation data used to generate the higher resolution texture maps from the lower resolution texture maps 409. The initialisation data used to generate the previously generated texture maps was stored so that the previous initialisation data can be reused in this method.

In general, the complete coarser scale texture maps required to generate the requested texture map will not have all been generated. These are therefore generated using a new first set of initialisation data 411 that is identical with the original set of initialisation data in the overlap regions 413. This new first set of initialisation data 411 is input into the first hierarchical algorithm 415, which outputs a new first texture map 417 which identical with the previously generated first texture map in the overlapping regions 407, but contains newly generated textures in the non-overlapping regions.

The new first texture map 417 is then input into a second hierarchical algorithm 419, along with an additional set of new initialisation data 421 that is identical in the overlapping regions 409 to the initialisation data used in generating the second texture map 423. This is the initialisation data on which the requested new texture map directly depends. The non-overlapping regions contain newly generated additional initialisation data, such as new random noise. The output of this second hierarchical algorithm 419 is a second new texture map 405 that is identical with the previously generated second texture map 403 in the overlapping regions 425, but contains newly generated textures in the non-overlapping regions.

The processes can be repeated iteratively to generate newly requested texture maps at any of the possible resolution scales that are identical to the previously calculated texture maps in the overlapping regions.

The generation of the new texture map regions can be performed in real time in an ad-hoc basis as the requirement to extend the previously generated textures becomes apparent. For example, a player in a game is moving within a game world. The texture maps are first generated to render an object in the game world when it is first seen. However, as the view of the object changes, for example as the player moves past it, new textures are required to render previously unseen parts of the object that are consistent with the textures already applied to the object. The method will calculate these as required.

The embodiment described in relation to FIG. 4 can be combined with any of the embodiments described in relation to FIGS. 1 to 3. For example, the further texture maps in FIG. 3 for the requested new texture map can be generated by determining the known texture maps in the overlapping regions.

In any of the embodiments described in relation to FIGS. 1 to 4, the hierarchical algorithms used can be trained to be texture specific. For example, a set of hierarchical algorithms specifically output a particular type of rock texture or a particular type of wood texture. The hierarchical algorithms can be stored in a library of hierarchical algorithms indexed by metadata, which includes the type of texture they are trained to output. In use, the hierarchical algorithms are selected from this library based on the desired texture to be generated.

Alternatively or additionally, the hierarchical algorithms can be used in a feed forward fashion, such as a pre-trained texture network. Here the hierarchical algorithms are trained to output texture maps when given an input (e.g. a texture/random noise). One hierarchical algorithm/network is trained per texture. At run-time the input is run through the network in a feed-forward fashion to get an output. For example, a texture and/or random noise pattern may be used as the given input, and when the hierarchical algorithm has been trained for the texture or random noise pattern, the input may be provided to said algorithm in a feed-forward fashion.

Alternatively or additionally, the hierarchical algorithms can be used in as part of an iterative optimisation process, where textures are generated to represent properties of given existing textures as an input. Here, at least 2 inputs are required, which may be representative of one or more textures and/or one or more random noise patterns. The output is iteratively optimised at run time to have similar features to the input texture map(s) producing a synthesised version of the content of any input visual data provided to the hierarchical algorithms.

The methods described herein can be performed remotely to the output destination of the texture maps. The methods may also be performed on a distributed network.

Any method or feature described herein can be implemented in either software or hardware.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

Some of the example embodiments are described as processes or methods depicted as diagrams. Although the diagrams describe the operations as sequential processes, operations may be performed in parallel, or concurrently or simultaneously. In addition, the order or operations may be re-arranged. The processes may be terminated when their operations are completed, but may also have additional steps not included in the figures. The processes may correspond to methods, functions, procedures, subroutines, subprograms, etc.

Methods discussed above, some of which are illustrated by the diagrams, may be implemented by hardware, software, firmware, middleware, microcode, hardware description languages, or any combination thereof. When implemented in software, firmware, middleware or microcode, the program code or code segments to perform the relevant tasks may be stored in a machine or computer readable medium such as a storage medium. A processing apparatus may perform the relevant tasks.

Figure 5:
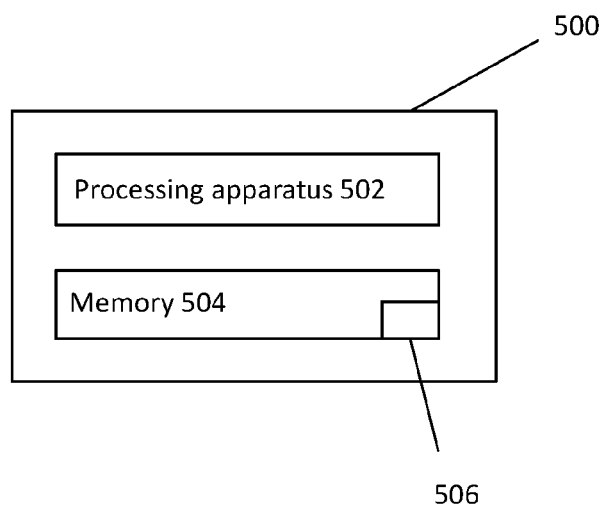
FIG. 5 shows an apparatus comprising a processing apparatus and memory according to an embodiment.

FIG. 5 shows an apparatus 500 comprising a processing apparatus 502 and memory 504 according to an embodiment. Computer-readable code 506 may be stored on the memory 504 and may, when executed by the processing apparatus 502, cause the apparatus 500 to perform methods as described here, for example a method with reference to FIGS. 1 to 4.

The processing apparatus 502 may be of any suitable composition and may include one or more processors of any suitable type or suitable combination of types. Indeed, the term "processing apparatus" should be understood to encompass computers having differing architectures such as single/multi-processor architectures and sequencers/parallel architectures. For example, the processing apparatus may be a programmable processor that interprets computer program instructions and processes data. The processing apparatus may include plural programmable processors. Alternatively, the processing apparatus may be, for example, programmable hardware with embedded firmware. The processing apparatus may alternatively or additionally include Graphics Processing Units (GPUs), or one or more specialised circuits such as field programmable gate arrays FPGA, Application Specific Integrated Circuits (ASICs), signal processing devices etc. In some instances, processing apparatus may be referred to as computing apparatus or processing means.

The processing apparatus 502 is coupled to the memory 504 and is operable to read/write data to/from the memory 504. The memory 504 may comprise a single memory unit or a plurality of memory units, upon which the computer readable instructions (or code) is stored. For example, the memory may comprise both volatile memory and non-volatile memory. In such examples, the computer readable instructions/program code may be stored in the non-volatile memory and may be executed by the processing apparatus using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc.

An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Methods described in the illustrative embodiments may be implemented as program modules or functional processes including routines, programs, objects, components, data structures, etc., that perform particular tasks or implement particular functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

Further implementations are summarized in the following examples.

Example 1

A method for generating textures for use in rendering visual output, the method comprising the steps of:
generating, using a first hierarchical algorithm, a first texture from one or more sets of initialisation data; and
selectively refining the first texture, using one or more further hierarchical algorithms, to generate one or more further textures from at least a section of the first texture and one or more sets of further initialisation data;
wherein at least a section of each of the one or more further textures differs from the first texture.

Example 2

A method according to example 1, wherein one or more of the one or more further textures differs from the first texture in being at a higher resolution.

Example 3

A method according to any preceding example, wherein one or more of the one or more further textures differs from the first texture in being different class of texture map.

Example 4

A method according to any preceding example, wherein the one or more of the one or more further textures differs from the first texture in comprising a region of texture not present in first texture.

Example 5

A method according to any preceding example, wherein the one or more sets of initialisation data comprises one or more initial sets of random noise.

Example 6

A method according to example 5, further comprising the step of generating the one or more initial sets of random noise.

Example 7

A method according to example 6, wherein the one or more sets of random noise are generated from one or more sets of noise parameters.

Example 8

A method according to example 7, wherein the one or more sets of noise parameters comprises at least one of: a random noise generator type; a random noise generator distribution; a seed or initialisation parameter; and/or one or more directional components and/or one or more noise generation procedures.

Example 9

A method according to examples 7 or 8, further comprising the step of storing the one or more sets of noise parameters.

Example 10

A method according to any preceding example, wherein the one or more sets of further initialisation data comprises one or more sets of further random noise.

Example 11

A method according to example 10, further comprising the step of generating the one or more sets of further random noise.

Example 12

A method according to example 11, wherein the one or more sets of further random noise are generated from one or more sets of further noise parameters.

Example 13

A method according to example 12, wherein the one or more sets of further noise parameters comprises at least one of: a random noise generator type; a random noise generator distribution; a seed; and/or a directional component or procedure.

Example 14

A method according to any of examples 12 or 13, further comprising the step of storing the one or more sets of further noise parameters.

Example 15

A method according to any preceding example, wherein the one or more sets of initialisation data comprises a known texture.

Example 16

A method according to any preceding example, wherein the one or more sets of further initialisation data comprises a known texture.

Example 17

A method according to examples 15 or 16, wherein the known texture comprises at least a part of a previously generated first texture and/or previously generated one or more further textures.

Example 18

A method according to any preceding example, further comprising the step of storing the first texture and/or one or more further textures in a texture library after they have been generated.

Example 19

A method according to any preceding example, wherein the first texture and/or one or more of the one or more further textures comprises a colour map.

Example 20

A method according to example 15, wherein the first texture and/or one or more of the one or more textures further comprises one or more additional maps comprising at least one of: a normal map; a height map; a bump map; a displacement map; a specular map; or a depth map.

Example 21

A method according to example 20, wherein the one or more additional maps are jointly optimised with the colour map and any of the other one or more additional maps.

Example 22

A method according to any of examples 1 to 19, further comprising the step of generating one or more additional maps from the first texture using a separate hierarchical algorithm.

Example 23

A method according to example 22, further comprising the step of generating one or more further additional maps from the second texture using an additional separate hierarchical algorithm.

Example 24

A method according to example 23, wherein the additional separate hierarchical algorithm additionally takes the one or more additional maps as an input.

Example 25

A method according to any of examples 23 or 24, wherein the one or more additional maps and/or one or more further additional maps comprises at least one of: a normal map; a height map; a bump map; a displacement map; a specular map; or a depth map.

Example 26

A method according to any preceding example, wherein the first and one or more of the one or more further hierarchical algorithms share one or more layers.

Example 27

A method according to any preceding example, wherein the first texture and/or one or more further textures are output in real time.

Example 28

A method according to any preceding example, wherein the one or more further textures comprises a plurality of further textures.

Example 29

A method according to any preceding example, wherein the hierarchical algorithms are texture specific.

Example 30

A method according to example 29, wherein the hierarchical algorithms are selected from a library of hierarchical algorithms based on properties of a texture required to be generated.

Example 31

A method according to any preceding example, wherein the hierarchical algorithms were developed using a learned approach.

Example 32

A method according to any preceding example, wherein the hierarchical algorithms comprise a feed forward process.

Example 33

A method according to any preceding example, wherein the hierarchical algorithms form a part of an iterative optimisation process.

Example 34

A method according to any preceding example, wherein each of the hierarchical algorithms comprises at least one: a nonlinear hierarchical algorithm; a neural network; a convolutional neural network; a layered algorithm; a recurrent neural network; a long short-term memory network; a multi-dimensional convolutional network; a memory network; or a gated recurrent network.

Example 35

A method of training hierarchical algorithms for use in texture generation, the method comprising the steps of:
generating one or more textures at a first resolution from a known texture at a second resolution using a hierarchical algorithm; and
optimising at least a subset of the hierarchical algorithm parameters based on results of comparing the statistics of the one or more textures to statistics of one or more further known textures at the first resolution;
wherein the first resolution higher than the second resolution.

Example 36

A method according to example 35, wherein the statistics of the one or more textures are calculated using a descriptor network.

Example 37

A method according to any of examples 35 or 36, wherein the hierarchical algorithm is stored in a library of hierarchical algorithms after being optimised.

Example 38

A method according to any of examples 35 to 37, wherein the hierarchical algorithm is trained to be texture specific.

Example 39

A method according to any of examples 35 to 38, wherein the hierarchical algorithm comprises at least one of a nonlinear hierarchical algorithm; a neural network; a convolutional neural network; a layered algorithm; a recurrent neural network; a long short-term memory network; a multi-dimensional convolutional network; a memory network; or a gated recurrent network.

Example 40

An apparatus substantially as hereinbefore described in relation to the FIGS. 1 to 4.

Example 41

A method substantially as hereinbefore described in relation to the FIGS. 1 to 4.

Example 42

Apparatus comprising:
at least one processor;
at least one memory including computer program code which, when executed by the at least one processor, causes the apparatus to perform the method of any one of examples 1 to 39.

Example 43

A computer readable medium having computer readable code stored thereon, the computer readable code, when executed by at least one processor, causing the performance of the method of any one of examples 1 to 39.

What is claimed is:

1. A method for generating texture maps for use in rendering visual output, the method comprising:
selecting a first hierarchical algorithm based on a first texture at a first resolution, the first hierarchical algorithm being selected from a library of hierarchical algorithms, the hierarchical algorithms in the library being trained to be texture specific;
generating, using the first hierarchical algorithm, a first texture map of a texture object from a first set of initialisation data;
in response to a requirement for a second texture map of the texture object at a second resolution that is higher than the first resolution, selecting a second hierarchical algorithm based on the first texture, the second resolution, and a second texture, the second hierarchical algorithm being selected from the library of the hierarchical algorithms, the second hierarchical algorithm being further trained based on an additional texture map;
generating, using the second hierarchical algorithm, the second texture map from at least a section of the first texture map and a second set of initialisation data, the second texture map being generated to be consistent with the first texture map, and at least a section of the second texture map being different from the first texture map; and
displaying the texture object using the second texture map, wherein the hierarchical algorithms generate a color map and at least one additional map based on the additional texture map including at least one of: a normal map; a height map; a bump map; a displacement map; a specular map; or a depth map.

2. The method according to claim 1, wherein the first set of initialisation data or the second set of initialisation data comprises one or more sets of random noise.

3. The method according to claim 2, further comprising:
generating the one or more sets of random noise.

4. The method according to claim 3, wherein the one or more sets of random noise are generated from one or more sets of noise parameters.

5. The method according to claim 4, wherein the one or more sets of noise parameters comprises at least one of: a random noise generator type; a random noise generator distribution; a seed or initialisation parameter; one or more directional components, or one or more noise generation procedures.

6. The method according to claim 4, further comprising:
storing the one or more sets of noise parameters.

7. The method of claim 1, further comprising:
generating a third texture map for a texture map region that partially overlaps with the second texture map at the second resolution.

8. The method of claim 7, wherein the generating the third texture map further comprises:
determining corresponding overlapping sections with the first texture map at the first resolution and corresponding sections of the second set of initialisation data used to generate the second texture map from the first texture map.

9. The method of claim 1, wherein the first texture map is generated at the first resolution based on a first viewing distance and the second texture map is generated at the second resolution based on a second viewing distance, the second viewing distance being closer to the texture object than the first viewing distance.

10. The method of claim 1, wherein the first and the second hierarchical algorithms generate the texture maps at different resolutions, the texture maps being indexed by an integer up to a total number of texture resolutions outputted by the hierarchical algorithms.

11. The method of claim 1, wherein,
the hierarchical algorithms in the library were trained on known sets of texture maps of a particular texture at different resolutions,
the known sets of texture maps contain known texture maps at a variety of resolutions, each indexed by an integer,
the selecting of the first hierarchical algorithm based on the first texture at the first resolution includes using a first integer index associated with the first texture, and
the selecting of the second hierarchical algorithm based on the first texture and the second resolution includes using a second integer index associated with the first texture.

12. A non-transitory computer readable medium having computer readable code stored thereon, the computer readable code, when executed by at least one processor, causing the performance of a method comprising:
selecting a first hierarchical algorithm based on a first texture at a first resolution, the first hierarchical algorithm being selected from a library of hierarchical algorithms, the hierarchical algorithms being trained to be texture specific;
generating, using the first hierarchical algorithm, a first texture map of a texture object from a first set of initialisation data;
in response to a requirement for a second texture map of the texture object at a second resolution that is higher than the first resolution, selecting a second hierarchical algorithm based on the first texture, the second resolution, and a second texture, the second hierarchical algorithm being selected from the library of the hierarchical algorithms, the second hierarchical algorithm being further trained based on an additional texture map;
generating, using the second hierarchical algorithm, the second texture map from at least a section of the first texture map and a second set of initialisation data, the second texture map being generated to be consistent with the first texture map, and at least a section of the second texture map being different from the first texture map; and
displaying the texture object using the second texture map, wherein the hierarchical algorithms generate a color map and at least one additional map based on the additional texture map including at least one of: a normal map; a height map; a bump map; a displacement map; a specular map; or a depth map.

13. The computer readable medium of claim 12, wherein the first set of initialisation data or the second set of initialisation data comprises one or more sets of random noise.

14. The computer readable medium of claim 13, the method further comprising:
generating the one or more sets of random noise.

15. A system comprising:
a processor;
a memory storing executable instructions that, when executed by the processor, causes the processor to perform steps comprising:
selecting a first hierarchical algorithm based on a first texture at a first resolution, the first hierarchical algorithm being selected from a library of hierarchical algorithms, the hierarchical algorithms in the library being trained to be texture specific;
generating, using the first hierarchical algorithm, a first texture map of a texture object from a first set of initialisation data;
in response to a requirement for a second texture map of the texture object at a second resolution that is higher than the first resolution, selecting a second hierarchical algorithm based on the first texture, the second resolution, and a second texture, the second hierarchical algorithm being selected from the library of the hierarchical algorithms, the second hierarchical algorithm being further trained based on an additional texture map including at least one of: a normal map; a height map; a bump map; a displacement map; a specular map; or a depth map;
generating, using the second hierarchical algorithm, the second texture map from at least a section of the first texture map and a second set of initialisation data, the second texture map being generated to be consistent with the first texture map, and at least a section of the second texture map being different from the first texture map; and
displaying the texture object using the second texture map, wherein the hierarchical algorithm generate a color map and at least one additional map based on the additional texture map.

16. The system of claim 15, wherein,
the hierarchical algorithms in the library were trained on known sets of texture maps of a particular texture at different resolutions,
the known sets texture maps contain known texture maps at a variety of resolutions, each indexed by an integer,
the selecting of the first hierarchical algorithm based on the first texture at the first resolution includes using a first integer index associated with the first texture, and
the selecting of the second hierarchical algorithm based on the first texture and the second resolution includes using a second integer index associated with the first texture.

17. The system of claim 15, wherein the first set of initialisation data or the second set of initialisation data includes one or more sets of random noise.

18. The system of claim 15, wherein the first texture map is generated at the first resolution based on a first viewing distance and the second texture map is generated at the second resolution based on a second viewing distance, the second viewing distance being closer to the texture object than the first viewing distance.

19. The system of claim 15, further comprising:
generating a third texture map for a texture map region that partially overlaps with the second texture map at the second resolution.

20. The system of claim 15, wherein,
the first set of initialisation data or the second set of initialisation data includes at least one set of random noise based on at least one set of noise parameters, and
the at least one set of noise parameters includes at least one of: a random noise generator type; a random noise generator distribution; a seed or initialisation parameter; one or more directional components, or one or more noise generation procedures.

* * * * *

UNITED STATES PATENT AND TRADEMARK OFFICE
CERTIFICATE OF CORRECTION

PATENT NO. : 10,909,743 B2  
APPLICATION NO. : 15/856759  
DATED : February 2, 2021  
INVENTOR(S) : Theis et al.

Page 1 of 1

It is certified that error appears in the above-identified patent and that said Letters Patent is hereby corrected as shown below:

In the Claims

In Column 20, Claim 16, Line 50, delete "sets" and insert -- sets of --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*